United States Patent
Smith

(10) Patent No.: US 10,069,180 B2
(45) Date of Patent: Sep. 4, 2018

(54) THERMOELECTRIC BATTERY COOLING SYSTEM AND METHOD

(71) Applicant: FORD GLOBAL TECHNOLOGIES, LLC, Dearborn, MI (US)

(72) Inventor: Mark G. Smith, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 226 days.

(21) Appl. No.: 14/887,477

(22) Filed: Oct. 20, 2015

(65) Prior Publication Data

US 2017/0110775 A1 Apr. 20, 2017

(51) Int. Cl.

| | |
|---|---|
| F25B 21/00 | (2006.01) |
| H01M 10/6572 | (2014.01) |
| H01M 10/613 | (2014.01) |
| H01M 10/625 | (2014.01) |
| F25B 21/02 | (2006.01) |
| F25B 21/04 | (2006.01) |
| F28D 1/02 | (2006.01) |
| F28D 15/00 | (2006.01) |
| H01M 10/6567 | (2014.01) |

(52) U.S. Cl.
CPC ......... *H01M 10/6572* (2015.04); *F25B 21/02* (2013.01); *F25B 21/04* (2013.01); *F28D 1/024* (2013.01); *F28D 15/00* (2013.01); *H01M 10/613* (2015.04); *H01M 10/625* (2015.04); *H01M 10/6567* (2015.04); *F25B 2321/0212* (2013.01); *F25B 2700/2103* (2013.01); *F25B 2700/2104* (2013.01); *F25B 2700/2106* (2013.01); *F28F 2250/06* (2013.01); *F28F 2250/08* (2013.01); *H01M 2220/20* (2013.01)

(58) Field of Classification Search
CPC .......... B60H 1/00478; H01M 10/6572; H01M 10/613; H01M 10/625; H01M 10/6567; F25B 21/02; F25B 21/04; F25B 2700/2103; F25B 2700/2104; F28D 1/024
USPC .......................... 62/3.2, 3, 3.61, 3.62; 165/59
See application file for complete search history.

(56) References Cited

U.S. PATENT DOCUMENTS

| | | | |
|---|---|---|---|
| 5,229,702 A | 7/1993 | Boehling et al. | |
| 7,038,400 B2* | 5/2006 | Rimmer | H02J 3/10 307/150 |
| 7,779,639 B2* | 8/2010 | Goenka | B60H 1/004 136/204 |
| 8,806,882 B2* | 8/2014 | Bennion | B60H 1/00907 123/41.29 |

(Continued)

OTHER PUBLICATIONS

Suh, I.-S., H. Cho, and M. Lee, Abstract of Feasibility Study on Thermoelectric Device to Energy Storage System of an Electric Vehicle, Energy Journal, vol. 76, Nov. 1, 2014, p. 436-444, ISSN 0360-5442.

*Primary Examiner* — Melvin Jones
(74) *Attorney, Agent, or Firm* — Carlson, Gaskey & Olds, P.C.

(57) ABSTRACT

An exemplary electrified vehicle assembly includes a first coolant loop extending from a battery pack to a radiator, and a second coolant loop extending from the battery pack to a thermoelectric device. At least one valve is configured to permit flow through the first coolant loop to cool the battery pack under a first operating condition, and configured to permit flow within the second coolant loop to cool the battery under a second operating condition.

18 Claims, 2 Drawing Sheets

(56) References Cited

U.S. PATENT DOCUMENTS

| | | | |
|---|---|---|---|
| 8,915,091 B2* | 12/2014 | Goenka | B60H 1/00478 |
| | | | 62/3.3 |
| 8,955,314 B2 | 2/2015 | Pegg et al. | |
| 2010/0112419 A1 | 5/2010 | Jang et al. | |
| 2010/0155018 A1* | 6/2010 | Goenka | B60H 1/00278 |
| | | | 165/59 |
| 2011/0296855 A1* | 12/2011 | Johnston | B60L 3/0046 |
| | | | 62/79 |
| 2013/0327063 A1 | 12/2013 | Gawthrop | |
| 2014/0099521 A1 | 4/2014 | Kim et al. | |

* cited by examiner

THERMOELECTRIC BATTERY COOLING SYSTEM AND METHOD

TECHNICAL FIELD

This disclosure relates generally to cooling electrified vehicle batteries. More particularly, the disclosure relates to selectively cooling the batteries of electrified vehicles using a thermoelectric device.

BACKGROUND

Generally, electrified vehicles differ from conventional motor vehicles because electrified vehicles are selectively driven using one or more electric machines powered by batteries. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The batteries of electrified vehicles can require cooling. Some batteries are liquid cooled. Typically, a radiator transfers thermal energy from these batteries to ambient. Some electrified vehicles use a chiller to provide supplementary cooling to the batteries. The chiller is associated with a cabin climate control system.

SUMMARY

An electrified vehicle assembly according to an exemplary aspect of the present disclosure includes, among other things, a first coolant loop extending from a battery pack to a radiator and a second coolant loop extending from the battery pack to a thermoelectric device. At least one valve is configured to permit flow through the first coolant loop to cool the battery pack under a first operating condition, and is further configured to permit flow within the second coolant loop to cool the battery under a second operating condition.

In a further non-limiting embodiment of the foregoing assembly, the radiator transfers thermal energy from flow within the first coolant loop to ambient air outside a vehicle.

In a further non-limiting embodiment of any of the foregoing assemblies, the at least one valve is configured to permit flow through both the first and second coolant loops to cool the battery pack under a third operating condition.

In a further non-limiting embodiment of any of the foregoing assemblies, the thermoelectric device is powered by an electrical system of an electrified vehicle.

In a further non-limiting embodiment of any of the foregoing assemblies, the assembly includes a power control module configured to control power deliver from the electrical system to the thermal electric device.

In a further non-limiting embodiment of any of the foregoing assemblies, the first operating condition corresponds to a first temperature, and the second operating condition corresponds to a second temperature that is higher than the first operating temperature.

In a further non-limiting embodiment of any of the foregoing assemblies, the thermoelectric device is a Peltier device.

In a further non-limiting embodiment of any of the foregoing assemblies, the assembly includes a third coolant loop extending from the radiator to the thermoelectric device, the at least one is valve configured to permit flow through the third coolant loop to cool the thermoelectric device under the second operating condition.

In a further non-limiting embodiment of any of the foregoing assemblies, the assembly includes a first pump and a second pump. The first pump is configured to move flow through the first coolant loop under the first operating condition, and to move flow through the second coolant loop under the second operating condition. The second pump is configured to move flow through the third coolant loop under the second operating condition.

In a further non-limiting embodiment of any of the foregoing assemblies, at least a portion of the first coolant loop overlaps at least a portion of the second coolant loop, and the second coolant loop and third coolant loops are separate and distinct from each other.

A vehicle battery pack cooling method according to an exemplary aspect of the present disclosure includes, among other things, in a first operating condition, cooling a battery pack with flow moving along a first coolant loop between the battery pack and a radiator, and in a second operating condition, cooling the battery pack with flow moving along a second coolant loop between the battery pack and a thermoelectric device.

In a further non-limiting embodiment of the foregoing method, the method includes transferring thermal energy from flow within the first cooling loop to ambient air outside an electrified vehicle at the radiator.

In a further non-limiting embodiment of any of the foregoing methods, the method includes, in a third operating condition, cooling the battery pack with flow moving along both the first and second coolant loops.

In a further non-limiting embodiment of any of the foregoing methods, the method includes, in the second operating condition, powering the thermoelectric device with power from an electrical system of an electrified vehicle.

In a further non-limiting embodiment of any of the foregoing methods, the second coolant loop is entirely outside the radiator.

In a further non-limiting embodiment of any of the foregoing methods, the method includes, in the second operating condition, cooling the thermoelectric device with flow moving along a third cooling loop between the thermoelectric device and the radiator.

In a further non-limiting embodiment of any of the foregoing methods, the thermoelectric device is a Peltier device.

In a further non-limiting embodiment of any of the foregoing methods, a portion of the first cooling loop overlaps a portion of the second cooling loop.

In a further non-limiting embodiment of any of the foregoing methods, the method includes alternating from the first operating condition to the second operating condition in response to a temperature.

In a further non-limiting embodiment of any of the foregoing methods, the method includes, in a third operating condition, heating the battery pack with flow moving along a second coolant loop between the battery pack and a thermoelectric device.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to cooling a battery of an electrified vehicle. In particular, the disclosure relates to cooling a battery pack using a radiator and, under some conditions, cooling the battery pack using a thermoelectric device. The thermoelectric device is used instead of, for example, a chiller associated with a cabin air conditioning system of the vehicle.

Figure 1:
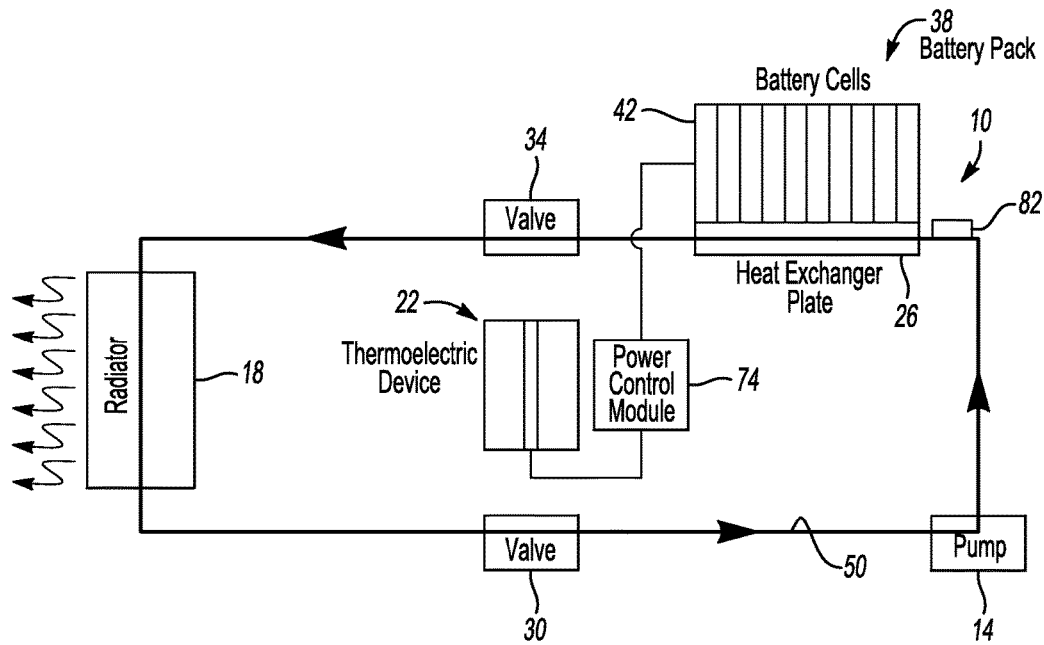
FIG. 1 shows an example battery cooling system operating under a first operating condition.

Referring to FIG. 1, an example battery cooling system 10 includes a pump 14, a radiator 18, a thermoelectric device 22, a heat exchange plate 26, a valve 30, and another valve 34. The heat exchange plate 26 is part of a battery pack 38. Within the battery pack 38, battery cells 42 are disposed on the heat exchange plate 26. The battery cooling system 10 is incorporated into an electrified vehicle.

Within the electrified vehicle, the battery cells 42 can provide power to motors that selectively drive one or more sets of vehicle drive wheels. An exemplary vehicle incorporating the system 10 is a hybrid vehicle having a first drive system including the motor and the battery pack 38, and a second drive system including an internal combustion engine and a generator. The two drive systems can selectively generate torque to drive the vehicle wheels.

In another example, the battery pack 38 provides power to an electric machine that drives wheels of a battery electric vehicle, which powers drive wheels exclusively using battery power.

The battery cells 42 can heat up during operation and when in high temperature environments. Maintaining a temperature of the battery cells 42 below a threshold temperature can enhance the efficiencies of the battery pack 38. In some examples, a threshold temperature for the battery cells 42 is 50 degrees Celsius.

In this example, fluid is moved through the heat exchange plate 26 to remove thermal energy from the battery cells 42 and other portions of the battery pack 38. In another example, fluid is instead, or additionally, moved through areas between the battery cells 42 to remove thermal energy. Thus, the battery cooling system 10 is not limited to the fluid cooling path shown.

In FIG. 1, the battery cooling system 10 is shown operating under a first operating condition. When operating under the first operating condition, the system 10 provides a first coolant loop 50 extending from the heat exchange plate 26 of the battery pack 38 to the radiator 18 and back.

The pump 14 moves a fluid along the first coolant loop 50. The fluid takes on heat from the battery pack 38 as the fluid moves along the first coolant loop 50 through the heat exchange plate 26. The heated fluid from the heat exchange plate 26 then moves along the first coolant loop 50 and is passed through the radiator 18. The fluid is a 50/50 mix of water and glycol in this example. Other fluids and mixtures of fluids could be used, however.

At the radiator 18, thermal energy transfers from fluid within the first coolant loop to ambient air outside an electrified vehicle having the system 10. In the first operating condition, the radiator 18 can provide sufficient cooling to the battery pack 38. A fan can be used to move air through the radiator 18. The radiator 18 can be one of several radiators cooled by a single fan. The other radiators can include radiators specific to an internal combustion engine, the trans-oil cooler, etc.

Operating the system 10 under the first operating condition can, in this example, provide fluid to the heat exchange plate at about 30° C. Under many conditions, fluid provided to the heat exchange plate 26 at this temperature removes sufficient thermal energy from the battery pack 38 to maintain the battery pack 38 at or below the threshold temperature.

Under some conditions, the first coolant loop 50 cannot remove sufficient thermal energy from the battery pack 38. For example, the vehicle could be operating in an extremely hot environment where the radiator 18 is unable to transfer sufficient thermal energy from fluid in the first coolant loop 50 to ambient air.

In response, the system 10 changes to operate under a second operating condition. When operating under the second operating condition, the system 10 provides cooling to the battery pack 38 when operating under the first operating condition would not provide enough cooling to the battery pack 38.

Figure 2:
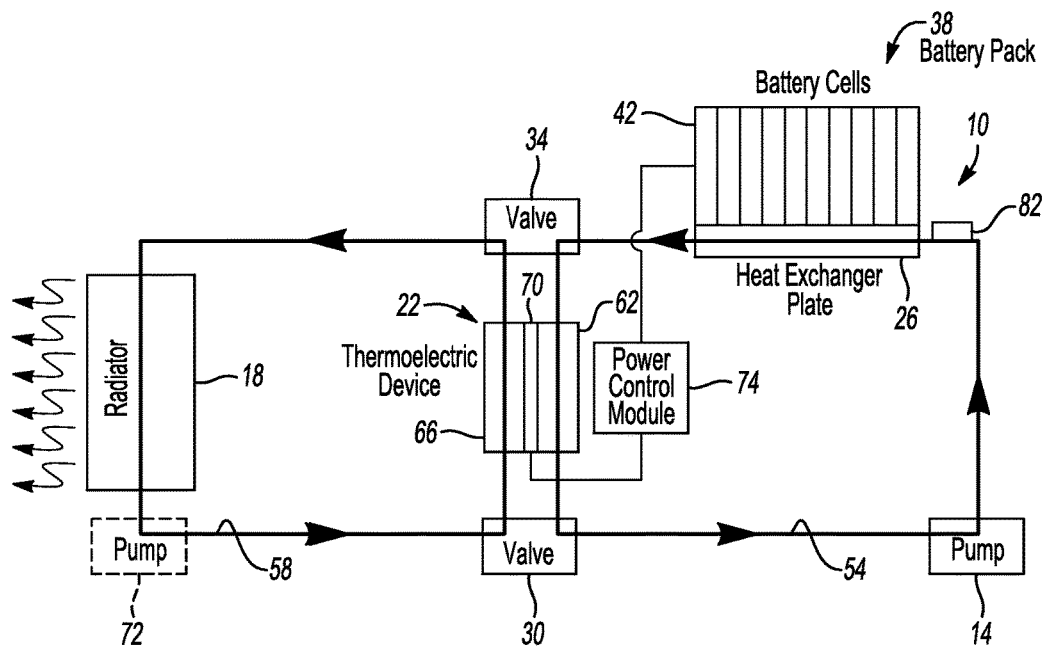
FIG. 2 shows the battery cooling system of FIG. 1 operating under a second operating condition.

Referring to FIG. 2, the system 10 is shown operating under the second operating condition. In the second operating condition, the system 10 provides a second coolant loop 54 that extends from the battery pack 38 to the thermoelectric device 22 and back. The system 10 additionally provides a third coolant loop 58 extending from the radiator 18 to the thermoelectric device 22 and back.

In this example, the valve 30 and the valve 34 are actuated to change the coolant loops within the system 10 from the positions of the first operating condition to the positions of the second operating condition. The second coolant loop 54 does not overlap with the third coolant loop 58, such that the second coolant loop 54 and the third coolant loop 58 are separate and distinct from each other.

The valves 30 and 34 can incorporate solenoids that are powered to actuate the valves 30 and 34 from the positions of the first operating condition to the positions of the second operating condition. Other types of valves could be used in other examples.

In this example, the second coolant loop 54 passes through a cold side 62 of the thermoelectric device 22. The third coolant loop 58 passes through a hot side 66 of the thermoelectric device 22.

The example thermoelectric device 22 is a Peltier device. When operating in the second operating condition, the system 10 passes a DC current through a junction 70 of the thermoelectric device 22. The junction 70 is positioned between the cold side 62 and the hot side 66. When current flows through the junction 70, the cold side 62 is cooled and the hot side 66 is heated.

As flow moves along the second coolant loop through the cold side 62 of the thermoelectric device 22, the fluid is cooled to a temperature appropriate for cooling the battery pack 38. The thermoelectric device 22 can provide cooling instead of the radiator 18, particularly at relatively high ambient temperatures.

Flow moving along the third coolant loop 58 carries thermal energy from the hot side 66 of the thermoelectric device 22 and transfers the thermal energy to ambient air at the radiator 18. A pump 72 separate from the pump 14 can be used to move flow along the third coolant loop 58.

In this example, an electric system of an electrified vehicle, such as the battery pack 38, provides power to a power control module 74 when the system 10 operates under the second operating condition. The power control module 74 is incorporated into the system 10 to regulate power from the battery pack 38 to the junction 70. The battery pack 38 may power other devices, such as control modules and a DC/DC converter, which then provide power the power control module 74. Sources of power other than the battery pack 38 could be used to power the thermoelectric device 22. For example, a 12 Volt side of a DC/DC converter could be used to power the power control module 74 and junction 70. Power sources can depend, in part, on whether the vehicle is a hybrid, or all electric, for example.

Operating the system 10 in the secondary operating condition thus provides cooling to the battery pack 38 when the radiator 18 cannot. The cooling in the secondary operating condition is provided without relying on a chiller associated with an air conditioning system of the vehicle and thus without detracting from the air conditioning system's ability to cool a passenger cabin of the vehicle.

In some examples, the thermoelectric device can be used to heat the battery pack 38 rather than cool the battery pack 38. For example, under an operating condition different than the second operating condition, the thermoelectric device can be powered with an opposite polarity so that the cold side 62 becomes a hot side and the hot side 66 becomes a cold side. Fluid moving along the second circuit is then heated at the thermoelectric device 22 and passed through the heat exchange plate 26 to warm the battery pack 38. Heating the battery pack 38 can be required when operating the vehicle in cold ambient temperature environments.

In some examples, the valve 34, the valve 30, or both are proportional valves that can be adjusted to positions that permit simultaneous flow through both the first coolant loop 50 and the second coolant loop 54 to cool the battery pack 38. In such an example, the portion of the third coolant loop 58 extending through the hot side 66 can be omitted. The hot side 66 could then be cooled with airflow for example.

Figure 3:
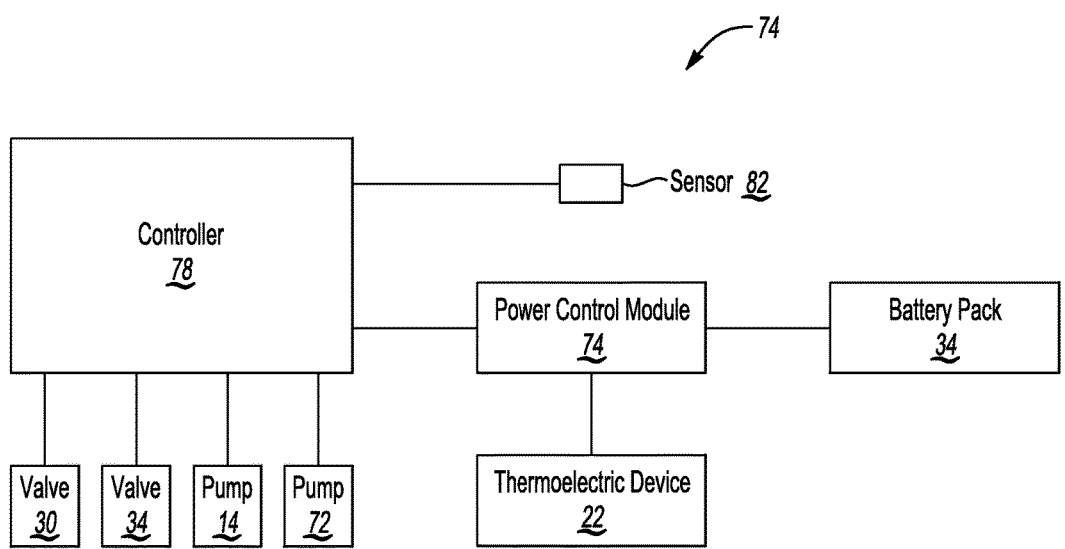
FIG. 3 shows a highly schematic view of a controller arrangement used with components of the battery cooling system of FIGS. 1 and 2.

Referring now to FIG. 3, an example control arrangement 74 is utilized in connection with the system 10 to control the positioning of the valves 30 and 34 and flow moved by the pumps 14 and 72.

In this example, the arrangement 74 includes a controller 78 operably linked to the power control module 74. In another example, the power control module 74 is part of the controller 78. The controller 78 can regulate cooling provided by the thermoelectric device 22 to the battery pack 38 via the power control module 74 when the system 10 is operated under the second operating condition. The battery pack 34 can power the power control module 74, or some other portion of an electrified vehicle power system can power the power control module 74.

The example controller 78 can include a processor operatively linked to a memory portion. The example processor is programmed to execute a program stored in the memory portion. The program can be stored in the memory portion as software code.

The program stored in the memory portion can include one or more additional or separate programs, each of which includes an ordered listing of executable instructions for implementing logical functions. The instructions enable the controller 78 to initiate movement of the valves 30 and 34 to change the system 10 from the first operating condition to the second operating condition. The instructions enable the controller 78 to regulate cooling provided by the thermoelectric device 22.

The controller 78 receives temperature data from a temperature sensor 82. The temperature sensor can measure, for example, a temperature of fluid entering the heat exchange plate 26. If the temperature of this fluid increases above a desired value, the controller 78 adjusts, among other things, the valves 30 and 34 and pumps 14 and 72 to change the system 10 from moving fluid along the first coolant loop 50 under the first operating condition, to move fluid along the second coolant loop 54 and the third coolant loop 58 under the second operating condition. The controller 78 switches the system 10 from the second operating condition back to the second operating condition in response to, for example, a sensor of the arrangement that monitors a temperature of fluid exiting the radiator 18 along the third coolant loop. If the temperature is low enough to provide appropriate cooling to the battery pack 38, the controller 78 switches the system 10 back to operate under the first operating condition, which conserves power.

The controller 78 can receive other temperature information in addition to the temperature of fluid entering the heat exchange plate. For example, ambient temperature measurements, battery cell temperature measurements, cabin temperature measurements, could be utilized by the controller 78. For drawing clarity, these other temperature information measurements are not shown schematically in FIG. 3.

In another example, the system 10 alternates between the first operating condition and the second operating condition in response to other variables, such as outside air temperature, the state of charge of the battery pack 38, the temperature of the battery pack 38, etc. For examples, the system 10 could operate under the first operating condition when ambient air temperature is less than 30 degrees Celsius and then switch to the second operating condition if the ambient air temperature reaches 30 degrees Celsius or above.

Although this exemplary system 10 is shown as incorporating the third coolant loop 58 when operating under the second operating condition, other examples may omit the third coolant loop 58 when the system 10 operates under the second operating condition. The hot side 66 could be air-cooled with a blower fan, for example.

Example features of some of the disclosed examples include providing additional cooling to a battery pack without involving a chiller, which can reduce complexity. If the thermoelectric device 22 is packaged close to the battery pack 38 within the vehicle, the thermal load on the thermoelectric device can be reduced by avoiding heat gain in the coolant lines between the chiller and the battery pack. The system can, in some examples, operate with a coefficient of performance that is near that of systems using a chiller to cool the battery pack 38.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle assembly, comprising:
   a first coolant loop extending from a battery pack to a radiator;
   a second coolant loop extending from the battery pack to a thermoelectric device powered by an electrical system of an electrified vehicle; and
   at least one valve configured to permit flow through the first coolant loop from the battery pack to the radiator to cool the battery pack under a first operating condition, and configured to permit flow through the second coolant loop to cool the battery under a second operating condition.

2. The assembly of claim 1, wherein the radiator transfers thermal energy from flow within the first coolant loop to ambient air outside the electrified vehicle.

3. The assembly of claim 1, wherein the valve is configured to permit flow through both the first and second coolant loops to cool the battery pack under a third operating condition.

4. The assembly of claim 1, further comprising a power control module configured to control power delivery from the electrical system to the thermoelectric device.

5. The assembly of claim 1, wherein the first operating condition corresponds to a first temperature, and the second operating condition corresponds to a second temperature that is higher than the first temperature.

6. The assembly of claim 1, wherein the thermoelectric device is a Peltier device.

7. An electrified vehicle assembly, comprising:
a first coolant loop extending from a battery pack to a radiator;
a second coolant loop extending from the battery pack to a thermoelectric device; and
at least one valve configured to permit flow through the first coolant loop to cool the battery pack under a first operating condition, and configured to permit flow within the second coolant loop to cool the battery under a second operating condition; and
a third coolant loop extending from the radiator to the thermoelectric device, the at least one valve configured to permit flow through the third coolant loop to cool the thermoelectric device under the second operating condition.

8. The assembly of claim 7, further comprising a first pump and a second pump,
the first pump configured to move flow through the first coolant loop under the first operating condition, and to move flow through the second coolant loop under the second operating condition,
the second pump configured to move flow through the third coolant loop under the second operating condition.

9. The assembly of claim 8, wherein at least a portion of the first coolant loop overlaps at least a portion of the second coolant loop, and the second coolant loop and third coolant loops are separate and distinct from each other.

10. A vehicle battery pack cooling method, comprising:
in a first operating condition, cooling a battery pack with flow moving along a first coolant loop between the battery pack and a radiator; and
in a second operating condition, cooling the battery pack with flow moving along a second coolant loop between the battery pack and a thermoelectric device, wherein a portion of the first coolant loop overlaps a portion of the second coolant loop.

11. The method of claim 10, further comprising transferring thermal energy from flow within the first coolant loop to ambient air outside an electrified vehicle at the radiator.

12. The method of claim 10, further comprising, in a third operating condition, cooling the battery pack with flow moving along the both the first and second coolant loops.

13. The method of claim 10, further comprising, in the second operating condition, powering the thermoelectric device with power from an electrical system of an electrified vehicle.

14. The method of claim 10, wherein the second coolant loop is entirely outside the radiator.

15. The method of claim 10, further comprising, in the second operating condition, cooling the thermoelectric device with flow moving along a third coolant loop between the thermoelectric device and the radiator.

16. The method of claim 10, wherein the thermoelectric device is a Peltier device.

17. A vehicle battery pack cooling method, comprising:
in a first operating condition, cooling a battery pack with flow moving along a first coolant loop between the battery pack and a radiator;
in a second operating condition, cooling the battery pack with flow moving along a second coolant loop between the battery pack and a thermoelectric device; and
alternating from the first operating condition to the second operating condition in response to a temperature.

18. The method of claim 10, further comprising, in a third operating condition, heating the battery pack with flow moving along the second coolant loop between the battery pack and the thermoelectric device.

* * * * *

UNITED STATES PATENT AND TRADEMARK OFFICE
CERTIFICATE OF CORRECTION

| | | |
|---|---|---|
| PATENT NO. | : 10,069,180 B2 | Page 1 of 1 |
| APPLICATION NO. | : 14/887477 | |
| DATED | : September 4, 2018 | |
| INVENTOR(S) | : Mark G. Smith | |

It is certified that error appears in the above-identified patent and that said Letters Patent is hereby corrected as shown below:

In the Claims

In Claim 12, Column 8, Line 17; replace "along the both the first" with --along both the first--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*